US006342706B1

(12) United States Patent
Takeda

(10) Patent No.: US 6,342,706 B1
(45) Date of Patent: Jan. 29, 2002

(54) RETROREFLECTIVE DETECTOR

(75) Inventor: Kenji Takeda, Ohtsu (JP)

(73) Assignee: Optex Co., Ltd., Ohtsu (JP)

( * ) Notice: Subject to any disclaimer, the term of this patent is extended or adjusted under 35 U.S.C. 154(b) by 0 days.

(21) Appl. No.: 09/550,603

(22) Filed: Apr. 17, 2000

(51) Int. Cl.[7] .............................................. G01N 21/86

(52) U.S. Cl. ............... 250/559.4; 250/200; 250/559.43; 250/221; 250/222.1

(58) Field of Search ............................ 250/559.01, 200, 250/559.43, 559.4, 221, 222.1; 434/20; 66/163

(56) References Cited

U.S. PATENT DOCUMENTS

| | | | | |
|---|---|---|---|---|
| 3,911,598 A | * 10/1975 | Mohon | | |
| 3,983,988 A | * 10/1976 | Maxted et al. | | |
| 4,248,272 A | * 2/1981 | Wilson et al. | .............. | 139/343 |

* cited by examiner

*Primary Examiner*—Robert H. Kim
*Assistant Examiner*—Pamela R. Hobden
(74) *Attorney, Agent, or Firm*—Wenderoth, Lind & Ponack, L.L.P.

(57) ABSTRACT

A retroreflective detector comprises a detection unit which houses two transmitting elements and two receiving elements, in which a transmitting element and a receiving element form a pair and two such pairs are disposed in a matrix arrangement. Every row and column of the matrix includes one or more transmitting elements.

6 Claims, 7 Drawing Sheets

(a)

(b)

RETROREFLECTIVE DETECTOR

BACKGROUND OF THE INVENTION

The present invention relates to retroreflective detectors which are arranged to emit a beam of light from a transmitter, reflect the light beam by a retroreflector and receive the reflected beam of light by a receiver. In particular, the present invention is directed to an improvement for preventing false signalling operation in response to the presence of objects.

As a detector for detecting persons or the like, Japanese Patent Laid-open Publication No. H8-265130 (JP-A-265130/1996) discloses a retroreflective detector. A detector of this type comprises a detection unit housing a transmitter and a receiver, and a retroreflector positioned opposite to the detection unit with a prescribed distance therebetween. This retroreflector comprises a prism called corner cube reflector for reflecting a beam of light emitted from the transmitter. The retroreflector functions to reflect (retroreflect) the incident light emitted from the transmitter in the direction opposite to the incident direction.

Where no object is present in the space between the detection unit and the retroreflector, a light beam (e.g. infrared ray) emitted from the transmitter is reflected by the retroreflector and then the reflected light is received by the receiver. On the other hand, where an object (e.g. a person) is present in or passes through the space between the detection unit and the retroreflector, the object interrupts the light beam emitted from the transmitter, causing the intensity of light received by the receiver to change. Hence, the presence or passage of an object is detected by evaluating changes of the intensity of the reflected light beam which is received by the receiver. To be specific, when the receiver receives no light beam reflected by the retroreflector, the detector signals the presence of an object.

Such a detector is distinguished in emitting a narrow beam of light from the transmitter. Therefore, a light beam reflected by the retroreflector is directed to the receiver with certainty. False operation is avoided by not expanding the width of emitted and reflected light beams excessively.

The narrow beams of light, on the other hand, cause the detector to recognise a passing object which should not be detected. For example, a detector originally installed for detecting the passage of persons is operated by mistake, when a leave, insect or the like passes near the transmitter and interrupts a narrow beam of light.

Another detector suggested to solve this problem comprises two transmitters and receivers each. FIGS. 6 and 7 illustrate two types of detection units 100, 110 each of which comprises two transmitters 101, 101 and two receivers 102, 102. In the detection unit 100 of FIG. 6, transmitters 101, 101 are horizontally disposed on the upper part of a light emitting/receiving surface 103, and receivers 102, 102 are horizontally disposed on the lower part thereof. In contrast, in the detection unit 110 of FIG. 7, transmitters 101, 101 are vertically disposed on one side (on the right in the figure) of the light emitting/receiving surface 103, and receivers 102, 102 are vertically disposed on the other side thereof (on the left in the figure). Arrows in each figure indicate emitted and reflected beams of light.

Each of these detection units 100, 110 causes a detector to signal the presence of an object only when light beams emitted from the transmitters 101, 101 are both interrupted at the same time. In other words, the detector does not signal the presence of a small passing object which interrupts only either of the light beams, but it signals the presence or passage of an object when both beams of light are interrupted at the same time. False operation is avoided accordingly.

Nevertheless, the above detection units 100, 110 still have some problems. The detection unit 100 of FIG. 6, which applies a horizontal arrangement of the identical elements, is operated by mistake when an object 104 shown by an imaginary line in FIG. 6 passes near the light emitting/receiving surface 103 (e.g. when an object 104 whose longitudinal sides extend in the horizontal direction falls down), because the light beams emitted from both transmitters 101, 101 are interrupted at the same time. In such circumstances, although the light emitting/receiving surface 103 is covered only by half, the detector wrongly signals the presence of an object.

Likewise, the detection unit 110 of FIG. 7, which applies a vertical arrangement of the identical elements, is operated by mistake when an object 104 shown by an imaginary line in FIG. 7 passes near the light emitting/receiving surface 103 (e.g. when an object 104 whose longitudinal sides extend in the vertical direction crosses), because the light beams emitted from both transmitters 101, 101 are interrupted at the same time. In these circumstances, too, although the light emitting/receiving surface 103 is covered only by half, the detector wrongly signals the presence of an object.

Such false signalling can be avoided by disposing two detection units each comprising a transmitter and a receiver and spaced from each other by a predetermined distance. This arrangement is intended to prevent simultaneous interruption of the light beams emitted from both transmitters even when an object having the above-specified shape may fall or cross.

However, since this arrangement involves an additional step of disposing the two detection units at two separate locations, it increases the installation steps of the detector and raises the production cost.

Alternatively, the detection unit may be enlarged such that the optical elements can be disposed on the edges of a large light emitting/receiving surface with proper distances. False signalling may be prevented by separating the optical elements from each other.

Yet again, this arrangement is not a practical solution. This is because the large detection unit occupies a greater installation space, and also because of its poor appearance and higher production cost.

OBJECTS AND SUMMARY OF THE INVENTION

The present invention has been made in view of the above problems and intends to provide a retroreflective detector comprising a plurality of transmitting elements and receiving elements which can effectively prevent false signalling without increasing the size of the detector.

To achieve this object, the present invention presupposes that the retroreflective detector comprises a detection unit housing a plurality of transmitting elements and a plurality of receiving elements on a light emitting/receiving surface, and retroreflective means disposed opposite to the detection unit with a predetermined distance, the retroreflective detector determining the presence, passage or absence of an object in a space between the detection unit and the retroreflective means based on whether a beam of light emitted from each transmitting element is reflected by the retroreflective means and the reflected beam of light is received by each receiving element. In this retroreflective detector, the detection unit houses a plurality of pairs of a transmitting element and a receiving element in a matrix arrangement, such that every row and column of the matrix includes at least one transmitting element.

In this arrangement, every row and column of the matrix also includes at least one receiving element. Then, the transmitting elements and the receiving elements disposed in such matrix arrangement can define the maximum of widths both in the row direction and the column direction. When a relatively small object which need not be detected may fall or pass through a detection space, beams of light emitted from the transmitting elements are partially interrupted by the falling or passing object. The emitted light beams are interrupted completely only when a falling or passing object covers all of the transmitting elements. It is understood that all transmitting elements are covered by an object which is greater than the dimension of horizontally or vertically arranged transmitting elements. Likewise, in the case where reflected beams of light are completely interrupted by an object, all receiving elements are covered by an object which is greater than the dimension of horizontally or vertically arranged receiving elements. To summarise, the presence of an object is not recognised, unless the object present in or passing through the detection space is as great as or greater than the dimension of the light emitting/receiving surface. Consequently, the detector does not detect or signal the presence of an object by mistake, when the light emitting/receiving surface is only half-covered (see FIGS. 6 and 7).

Preferably, the above detector is modified to dispose two of the transmitting elements at the most distant positions from each other along a diagonal line based on rows and columns of the matrix, and to dispose two of the receiving elements at the most distant positions from each other along the other diagonal line.

This arrangement utilises the maximum area of the light emitting/receiving surface and separates one each of the transmitting elements and the receiving elements as far as possible from each of another transmitting element and receiving element. The presence or passage of an object is not recognised unless both of the relatively distant transmitters or both of the similarly distant receiving elements are covered at the same time. This arrangement further guarantees prevention of false signalling operation caused by a relatively small falling or passing object which need not be detected, without increasing the size of the whole detector.

In both arrangements, it is desirable that a horizontal distance between the transmitting elements which are most distant from each other in the horizontal direction and a horizontal distance between the receiving elements which are most distant from each other in the horizontal direction are smaller than a horizontal dimension of an object to be detected. It is also preferred that a vertical distance between the transmitting elements which are most distant from each other in the vertical direction and a vertical distance between the receiving elements which are most distant from each other in the vertical direction are smaller than a vertical dimension of an object to be detected.

These arrangements provide specific distances between the transmitting elements and between the receiving elements.

These arrangements further enhances the reliability of the detector by preventing failure to detect the presence or passage of an object in the space between the detection unit and the retroreflective means.

DETAILED DESCRIPTION OF THE PREFERRED EMBODIMENTS

Hereinafter, embodiments of the present invention are described with reference to the drawings. For the purpose of describing the present embodiments, a retroreflective detector (hereinafter referred to as a detector) of the present invention is presumed to be installed on an ATM at a bank or the like and intended to detect a person as an object.

Figure 1:
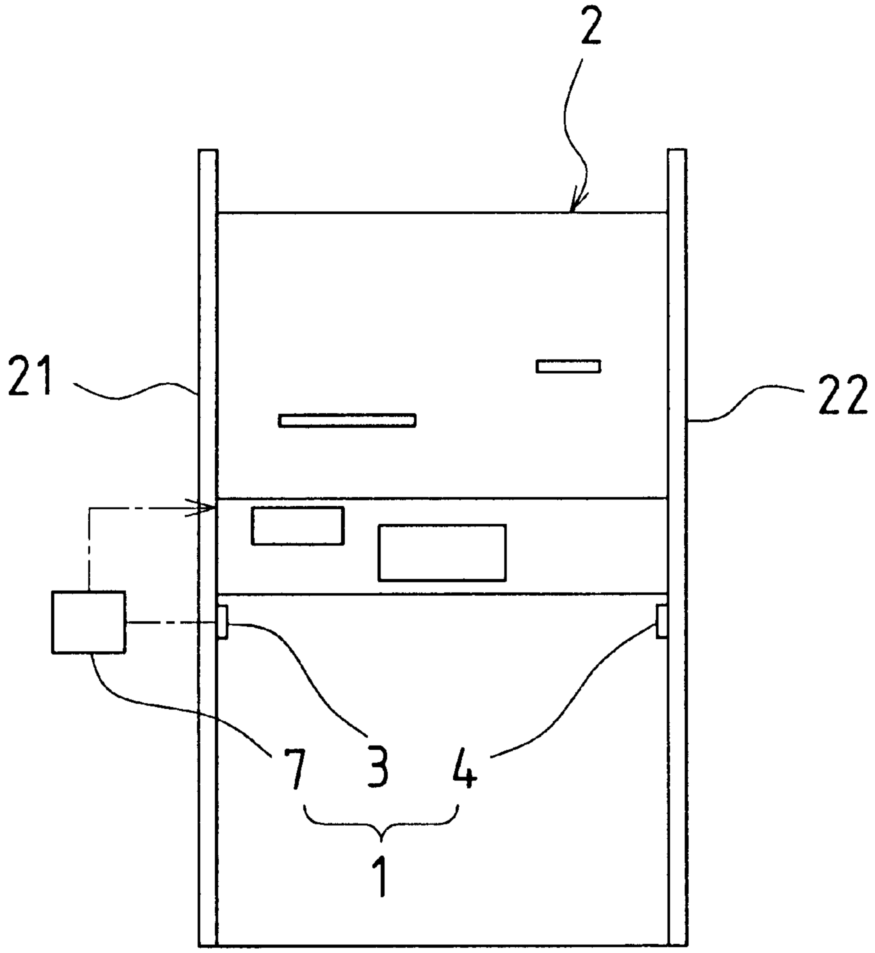
FIG. 1 is a front view of an automatic teller machine (hereinafter referred to as ATM) equipped with a retroreflective detector according to an embodiment of the present invention.

FIG. 1 is a front view of an ATM 2 equipped with a detector 1 of the present embodiment. As shown in FIG. 1, the ATM 2 is separated from adjoining ATMs (not shown) by partitions 21, 22 provided on both sides. The detector 1 is mounted on these partitions 21, 22. To be specific, the detector 1 comprises a detection unit 3, a retroreflector 4 as retroreflection means and a signalling unit 7, with the detection unit 3 mounted on the left partition 21 in the figure, and the retroreflector 4 on the right partition 22.

Figure 2:
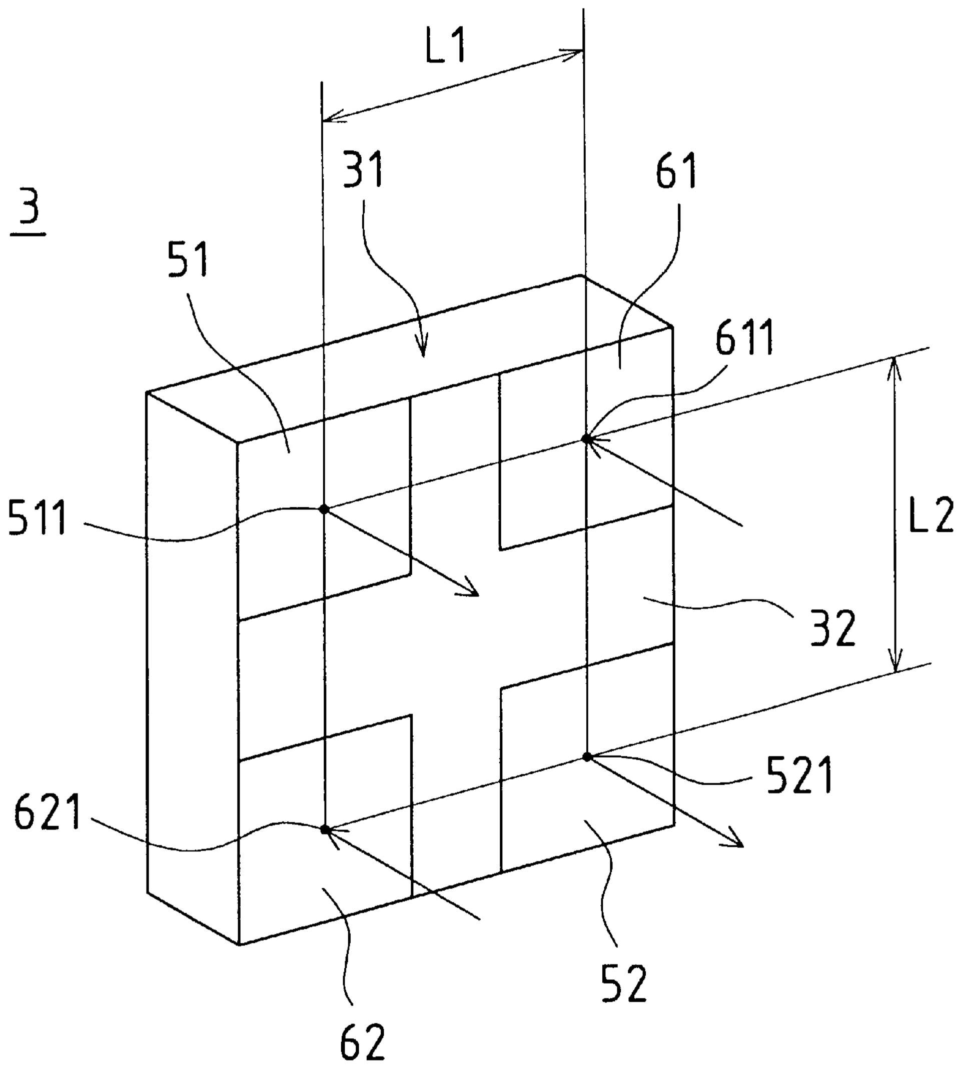
FIG. 2 is a perspective view of a detection unit.

FIG. 2 is a perspective view of the detection unit 3. As shown in FIG. 2, the detection unit 3 comprises two transmitting elements 51, 52 as light transmitting means and two receiving elements 61, 62 as light receiving means, each housed in a casing 31. Of the surfaces of the casing 31, the surface facing the retroreflector 4 (the near surface in FIG. 2) constitutes a quadrangle light emitting/receiving surface 32 for mounting the transmitting elements 51, 52 and the receiving elements 61, 62. Namely, the transmitting elements 51, 52 are arranged to emit beams of light from the light emitting/receiving surface 32 toward the retroreflector 4, and the receiving elements 61, 62 are arranged to receive the beams of light reflected by the retroreflector 4 toward the light emitting/receiving surface 32.

A feature of the detection unit 3 resides in the arrangement of the elements 51, 52, 61, 62. According to the arrangement, the transmitting elements 51, 52 are disposed on a pair of diagonal corners in the light emitting/receiving surface 32, while the receiving elements 61, 62 are disposed on the other pair of diagonal corners. In other words, the transmitting elements 51, 52 are not adjacent to each other in the horizontal or vertical direction (diagonal arrangement), nor are the receiving elements 61, 62 adjacent to each other in the horizontal or vertical direction (diagonal arrangement). Referring to FIG. 2, the transmitting elements 51, 52 are located on the upper left corner and the lower right corner. The receiving elements 61, 62 are located on the upper right corner and the lower left corner. In FIG. 2, the emission and reflection of light beams are indicated by arrows.

Alternatively, in the arrangement of FIG. 2, the transmitting elements may be located on the upper right corner and the lower left corner, and the receiving elements may be located on the upper left corner and the lower right corner.

A distance L1 is defined as a horizontal distance between centres 511, 521 of the transmitting elements 51, 52 and between centres 611, 621 of the receiving elements 61, 62. The horizontal distance L1 should be smaller than the width of a person (e.g. 100 mm). As a result, when a person stands in front of the detection unit 3, all of the transmitting elements 51, 52 and the receiving elements 61, 62 are covered by the person's body, so that the beams of light emitted from the transmitting elements 51, 52 cannot reach the retroreflector 4.

The detector 1 of the present embodiment is intended for detecting a person, and the horizontal distance L1 between identical elements is determined as such. Additionally, according to diverse applications of the detector, a distance L2 as a vertical distance between identical elements may be set smaller than the vertical dimension of an object to be detected.

The retroreflector 4 comprises a prism called corner cube retroreflector which reflects beams of light emitted from the transmitting elements 51, 52, and is arranged to reflect (retroreflect) incident light beams emitted from the transmitting elements 51, 52 in the direction opposite to the incident direction. This retroreflector 4 is arranged to reflect a beam of light emitted from the transmitting element 51 back to the receiving elements 61, 62, and to reflect a beam of light emitted from the transmitting element 52 back to the receiving elements 61, 62.

As shown in FIG. 1, the detection unit 3 is connected to a signalling unit 7 in the detector 1. The signalling unit 7 receives signals from both receiving elements 61, 62. When no beam of light reflected by the retroreflector 4 is incident to the receiving elements 61, 62, the signalling unit 7 receives signals from the receiving elements 61, 62 and in turn produces a signal for activating the ATM 2.

The following description demonstrates how the detector 1 detects the presence of a person.

When there is no person near the ATM 2, the light beams (e.g. infrared rays) emitted from the transmitting elements 51, 52 are reflected by the retroreflector 4, and in turn the reflected light beams are received by the receiving elements 61, 62. In this state, the signalling unit 7 does not give a signal for activating the ATM 2.

On the other hand, when a person approaches the ATM 2 and enters the space between the detection unit 3 and the retroreflector 4 (in front of the operation panel of the ATM 2), the light beams emitted from the transmitting elements 51, 52 are interrupted by his body, and in turn the receiving elements 61, 62 receive light beams of reduced intensity. The signalling unit 7 produces an output signal corresponding to such intensity of light. Thus, the signalling unit 7 signals the presence of an object and activates the ATM 2 (e.g. to light a monitor display).

As mentioned above, in the detection unit 3 of the detector 1, the transmitting elements 51, 52 are neither horizontally nor vertically adjacent to each other, and the receiving elements 61, 62 are neither horizontally nor vertically adjacent to each other. This arrangement prevents false signalling in the following manners (A) and (B).

Figure 3:
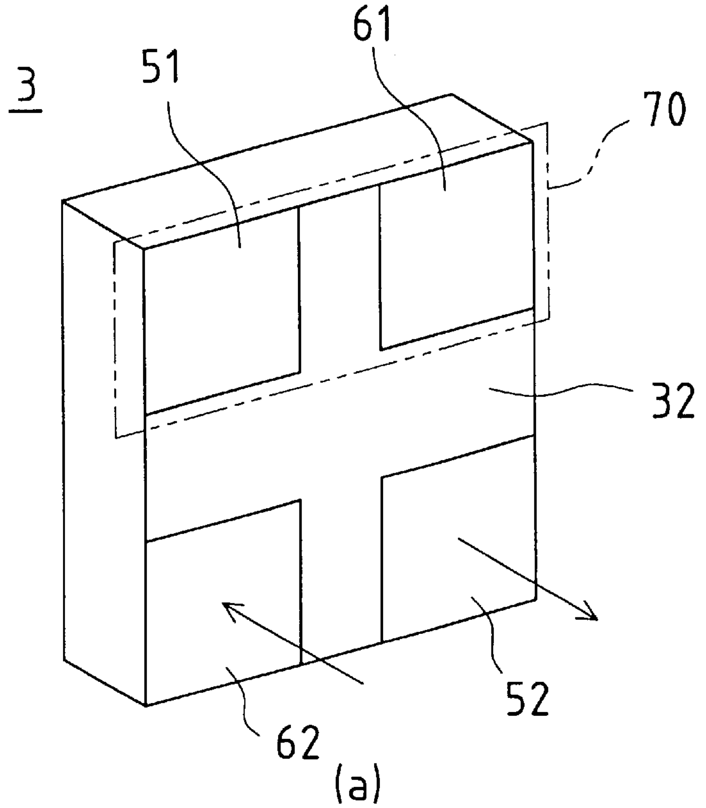
FIGS. 3(*a*), (*b*) are views illustrating the arrangements for preventing false signalling operation, wherein FIG. 3(*a*) illustrates a situation where an object 70 whose longitudinal sides extend in the horizontal direction passes in front of the light emitting/receiving surface, and FIG. 3(*b*) illustrates a situation where an object 71 whose longitudinal sides extend in the vertical direction passes in front of the light emitting/receiving surface.
Figure 3:
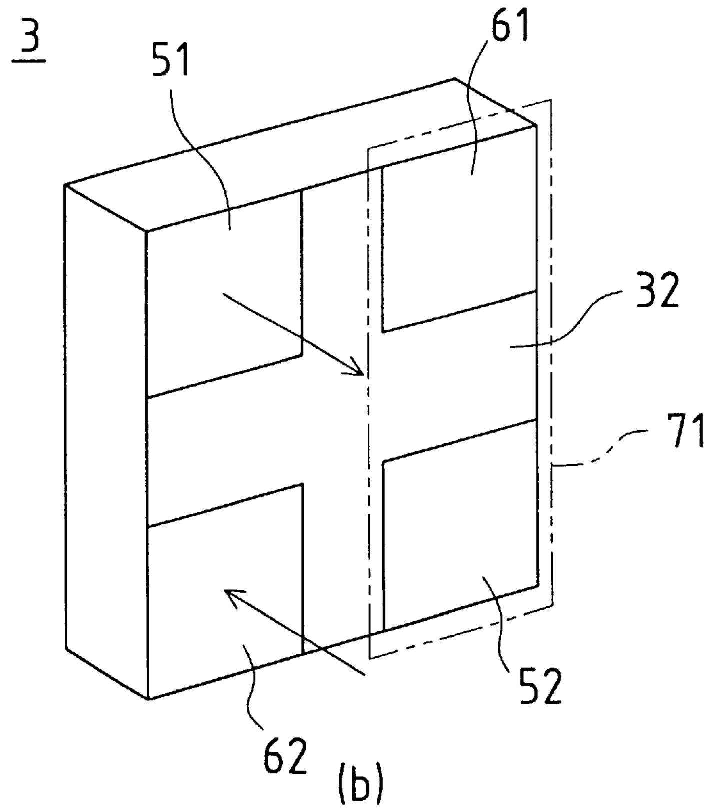

(A) FIG. 3(*a*) illustrates a situation where an object 70 whose longitudinal sides extend in the horizontal direction (as shown by the imaginary line) passes or falls down near the light emitting/receiving surface 32. Although the transmitting element 51 and the receiving element 61 are covered by the object 70, the transmitting element 52 and the receiving element 62 are not covered by the object 70. In this case, the signalling unit 7 does not signal the presence of the object 70, so that the ATM 2 is not activated by mistake.

(B) FIG. 3(*b*) illustrates a situation where an object 71 whose longitudinal sides extend in the vertical direction (as shown by the imaginary line) passes near the light emitting/receiving surface 32. The transmitting element 52 and the receiving element 61 are covered by the object 71, whereas the transmitting element 51 and the receiving element 62 are not covered by the object 71. Likewise, the signalling unit 7 does not signal the presence of the object 71, so that the ATM 2 is not activated by mistake.

According to the arrangement of the present embodiment, no false signal is produced when an object covers only the half of the light emitting/receiving surface 32.

Figure 4:
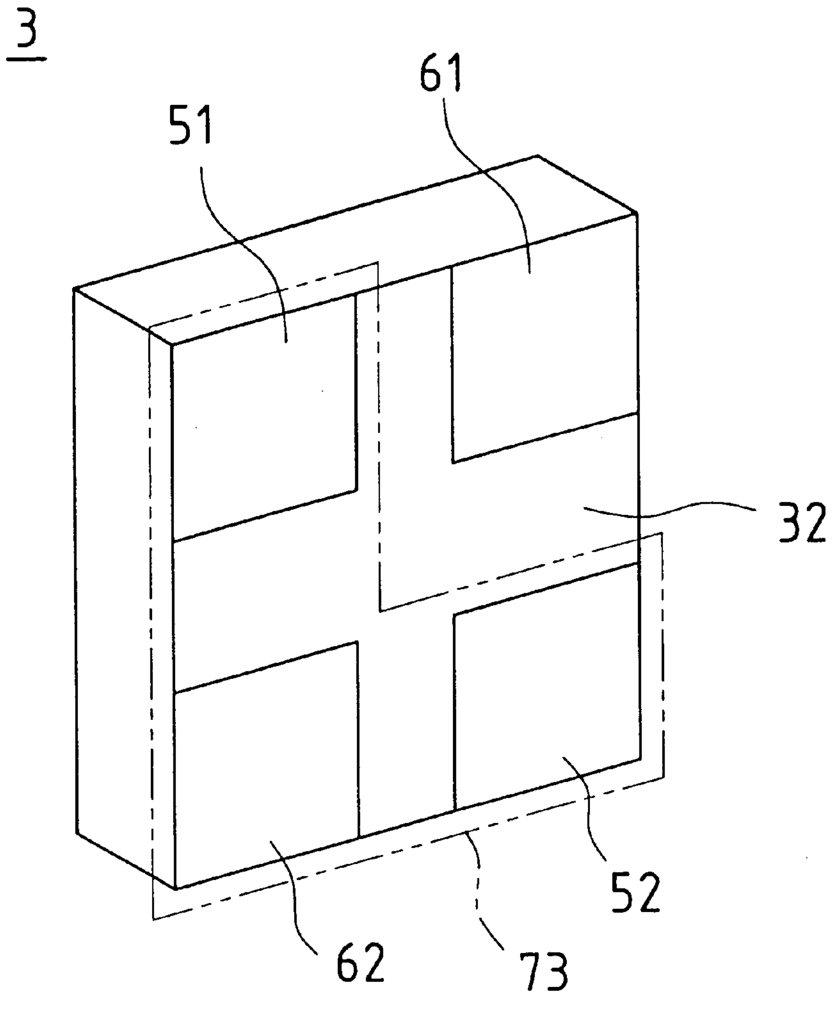
FIG. 4 is a view for illustrating a situation causing signalling operation according to the embodiment of the present invention.
Figure 6:
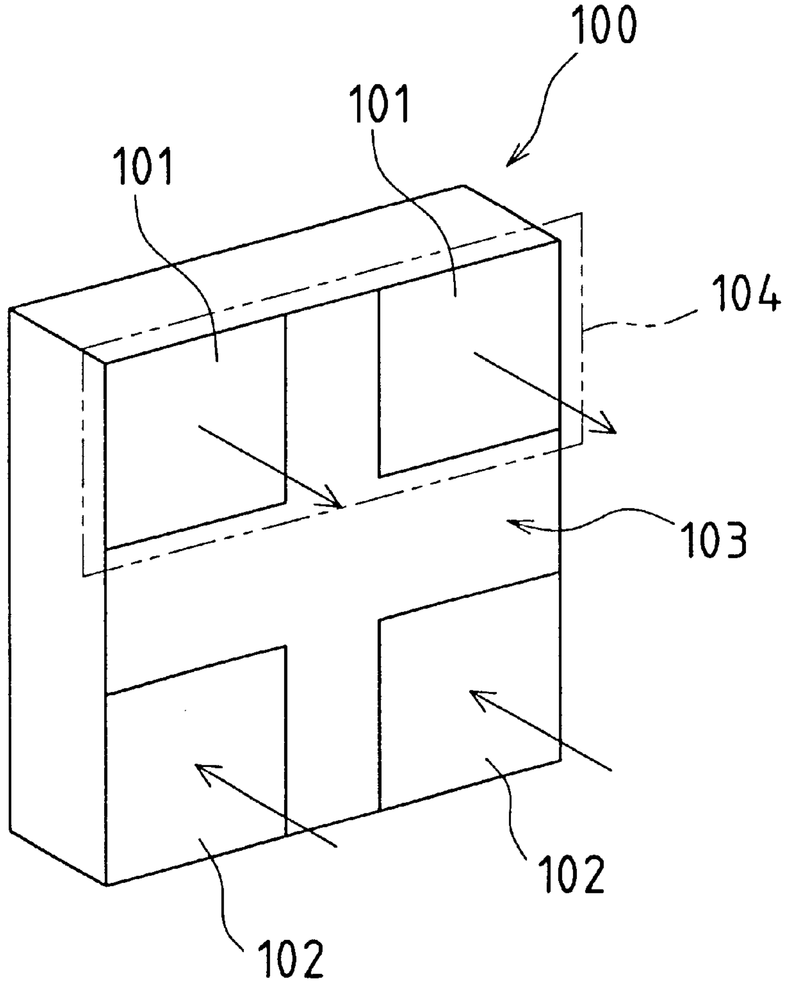
Fig.6 Prior Art
FIG. 6 is a view for illustrating a situation causing false signalling operation by a conventional detector.
Figure 7:
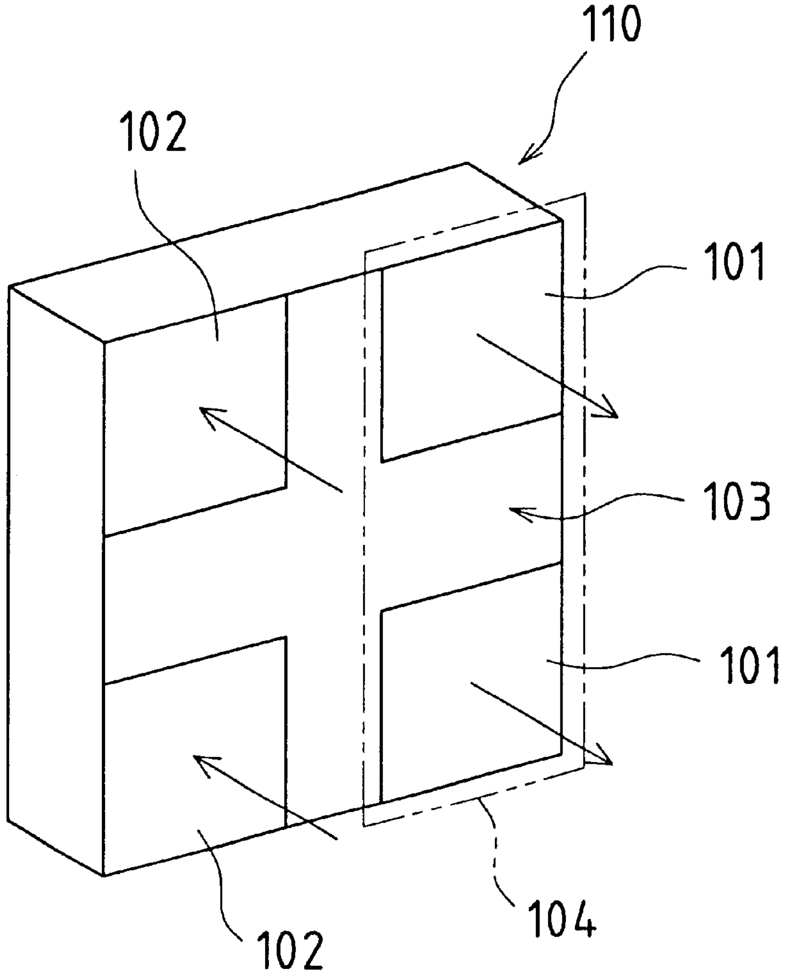
Fig.7 Prior Art
FIG. 7 is a view for illustrating a situation causing false signalling operation by another conventional detector.

Referring now to FIG. 4, signalling operation of the detector 1 takes place, for example, in response to the presence or passage of an object 73 as illustrated by the imaginary line. When the object 73 covers both transmitting elements 51, 52, no beam of light is reflected by the retroreflector 4 or received by the receiving elements 61, 62. The absence of the incidence of reflected light beams causes the signalling operation of the detector 1. However, it is highly unlikely that an object passing near the detection unit 3 has the shape of the object 73. In fact, it is reasonable to assume that the detector 1 signals the presence of an object when the object covers the entire area of the light emitting/receiving surface 32 of the detection unit 3. In the conventional arrangements shown in FIGS. 6 and 7, each of which employs two transmitting elements and two receiving elements, the detector signals the presence of an object when half of the light emitting/receiving surface is covered by the object. On the other hand, the arrangement of the present embodiment allows the detector 1 to signal only when the light emitting/receiving surface 32 is covered entirely by an object (e.g. person), without increasing the number of the transmitting elements 51, 52 and the receiving elements 61, 62.

As explained, the detection unit 3 houses two transmitting elements 51, 52 and two receiving elements 61, 62, wherein the transmitting elements 51, 52 are neither horizontally nor vertically adjacent to each other and the receiving elements 61, 62 are neither horizontally nor vertically adjacent to each other. This arrangement allows the detector 1 to signal the presence of an object, only when the light emitting/receiving surface 32 is covered entirely by a person or the like. As a result, it is possible to prevent unwanted recognition and false signalling of an object when the light emitting/receiving surface is only half-covered. Thus, the present embodiment can prevent false signalling without enlarging the size of the detection unit 3 or increasing the number of transmitting elements and receiving elements. Besides, the resulting detector 1 is remarkably reliable, and still obtainable without increasing its installation steps and production cost or sacrificing its appearance.

In the above embodiment, the retroreflective detector 1 of the present invention is supposed to be installed on the ATM 2. Such description, however, should not limit the scope of the present invention. The present invention is also applicable to various applications such as for detecting persons going through a door, detecting vehicles passing an automated toll payment system for toll roads, or the like.

Figure 5:
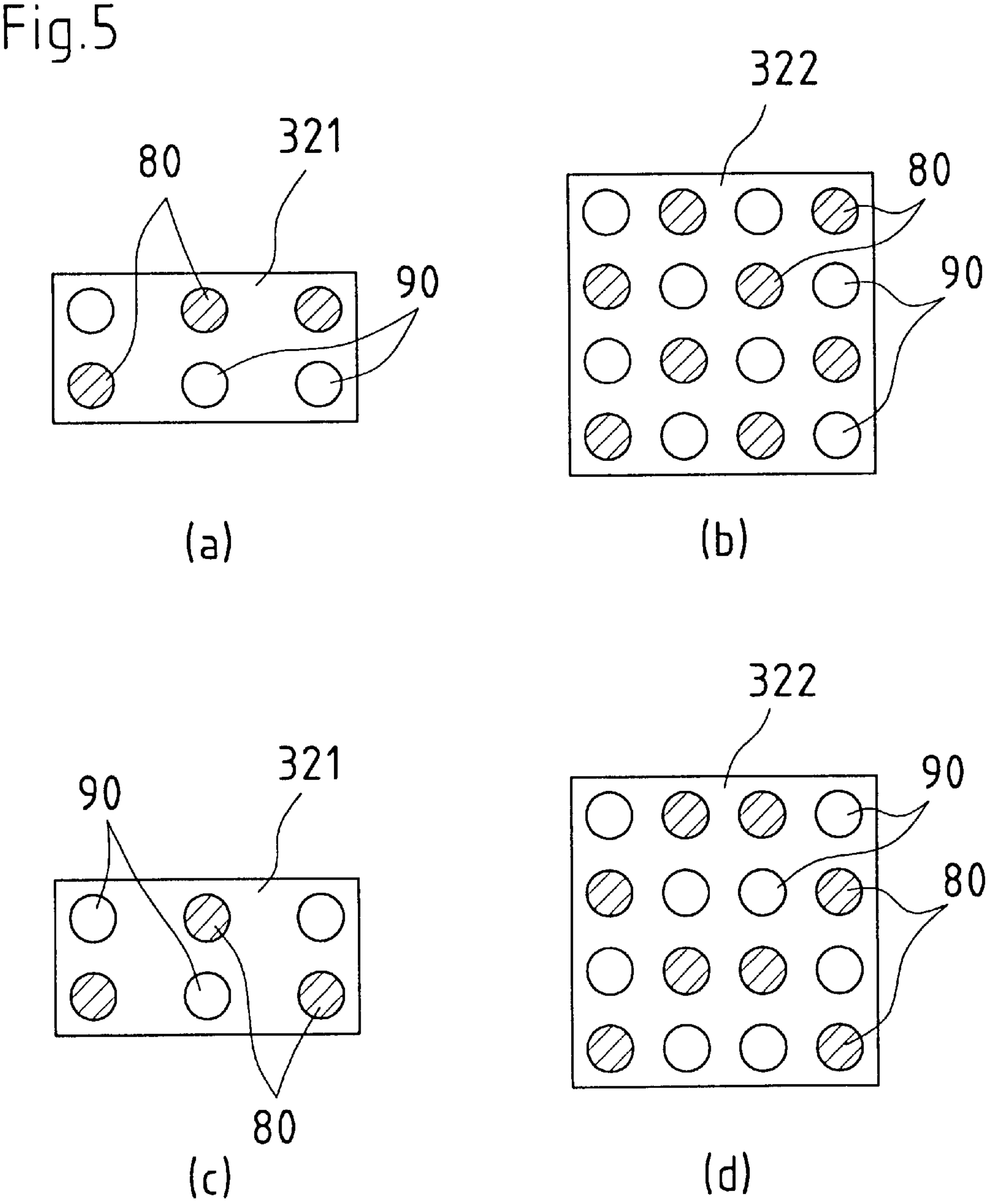
FIGS. 5(*a*) to (*d*) are views showing various arrangements of the transmitting elements and receiving elements applicable to the detection unit of the present invention.

Further, the above embodiment is arranged to house the transmitting elements 51, 52 and the receiving elements 61, 62 inside the detection unit 3 in a 2×2 matrix arrangement. However, as far as being encompassed in the scope of the claims, the optical elements can be disposed in various arrangements. For example, FIGS. 5(*a*) and (*c*) show a 2×3 matrix arrangement composed of three each of elements 80, 90. FIGS. 5(*b*) and (*d*) show a combination utilising four units of the 2×2 matrix arrangement of a transmitting element and a receiving element as shown in FIG. 2.

The embodiments of FIGS. 5(*a*) and (*c*) and those of FIGS. 5(*b*) and (*d*) are different in the configurations of the light emitting/receiving surfaces 321, 322 as well as the number of transmitting elements 80 and receiving elements 90. From another aspect, the embodiments of FIGS. 5(*a*) and (*b*) and those of FIGS. 5(*c*) and (*d*) arrange the transmitting elements 80 and the receiving elements 90 in different patterns. Among these variations, the embodiments of FIGS. 5(*a*) and (*b*) are preferable to those of FIGS. 5(*c*) and (*d*), because, based on the rows and columns of the matrix, the transmitting elements 80 locate at the most distant positions from each other along one diagonal line of the matrix and the receiving elements 90 locate at the most distant positions from each other along the other diagonal line.

As for the light emitting/receiving surface 32, its external configuration is not limited to a quadrangle as in the above-described embodiment, but circular and other optional configurations are also applicable.

What is claimed is:

1. A retroreflective detector which comprises a detection unit housing a plurality of transmitting elements and a plurality of receiving elements on a light emitting/receiving surface, and retroreflective means disposed opposite to the detection unit with a predetermined distance, the retroreflective detector determining the presence, passage or absence of an object in a space between the detection unit and the retroreflective means based on whether a beam of light emitted from each transmitting element is reflected by the retroreflective means and the reflected beam of light is received by each receiving element, wherein the detection unit houses a plurality of pairs of a transmitting element and a receiving element in a matrix arrangement, such that every row and column of the matrix includes at least one transmitting element.

2. A retroreflective detector according to claim 1, wherein two of the transmitting elements are disposed at the most distant positions from each other along a diagonal line based on rows and columns of the matrix, and two of the receiving elements are disposed at the most distant positions from each other along the other diagonal line.

3. A retroreflective detector according to claim 1 wherein a horizontal distance between the transmitting elements which are most distant from each other in the horizontal direction and a horizontal distance between the receiving elements which are most distant from each other in the horizontal direction are smaller than a horizontal dimension of an object to be detected.

4. A retroreflective detector according to claim 1 wherein a vertical distance between the transmitting elements which are most distant from each other in the vertical direction and a vertical distance between the receiving elements which are most distant from each other in the vertical direction are smaller than a vertical dimension of an object to be detected.

5. A retroreflective detector according to claim 2, wherein a horizontal distance between the transmitting elements which are most distant from each other in the horizontal direction and a horizontal distance between the receiving elements which are most distant from each other in the horizontal direction are smaller than a horizontal dimension of an object to be detected.

6. A retroreflective detector according to claim 2, wherein a vertical distance between the transmitting elements which are most distant from each other in the vertical direction and a vertical distance between the receiving elements which are most distant from each other in the vertical direction are smaller than a vertical dimension of an object to be detected.

* * * * *